(12) United States Patent
Reed et al.

(10) Patent No.: US 9,057,205 B2
(45) Date of Patent: Jun. 16, 2015

(54) PLATFORM ASSEMBLY FOR A WIND TURBINE TOWER

(75) Inventors: James E. Reed, Spartanburg, SC (US); James C. Butts, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 709 days.

(21) Appl. No.: 13/344,700

(22) Filed: Jan. 6, 2012

(65) Prior Publication Data

US 2013/0174508 A1    Jul. 11, 2013

(51) Int. Cl.
*E04H 12/34* (2006.01)
*E04H 12/08* (2006.01)
*F03D 11/04* (2006.01)

(52) U.S. Cl.
CPC ............... *E04H 12/08* (2013.01); *F03D 11/04* (2013.01); *F05B 2240/912* (2013.01); *Y02E 10/728* (2013.01)

(58) Field of Classification Search
CPC ..... E04H 12/08; E04H 12/12; F03D 11/0075; F03D 11/04; F03D 11/045; F05B 2240/90; F05B 2240/91; F05B 2240/912
USPC ......... 415/4.1, 4.3, 4.5, 905, 908; 416/244 R, 416/DIG. 6; 52/173.1, 650.3, 651.01, 655.1
See application file for complete search history.

(56) References Cited

U.S. PATENT DOCUMENTS

| 7,762,037 | B2 | 7/2010 | Meiners |
| 2009/0126309 | A1* | 5/2009 | Lyness et al. ................. 52/650.3 |
| 2010/0132278 | A1* | 6/2010 | Gurk et al. ...................... 52/184 |
| 2010/0186342 | A1 | 7/2010 | Ollgaard |
| 2011/0140437 | A1 | 6/2011 | Vemuri et al. |

FOREIGN PATENT DOCUMENTS

WO    WO 2009155927 A1 * 12/2009

* cited by examiner

*Primary Examiner* — Dwayne J White
*Assistant Examiner* — Alexander White
(74) *Attorney, Agent, or Firm* — Dority & Manning, P.A.

(57) ABSTRACT

A modular platform assembly for a wind turbine tower includes a core platform sub-assembly having an underlying structural support grid. A plurality of platform extension panels are disposed circumferentially around at least a portion of a perimeter of the core platform sub-assembly. Support extensions are configured on the support grid at a plurality of circumferential positions around the core platform sub-assembly, with the platform extension panels supported by the support extension. The support extensions are mountable to a wall within a wind turbine tower and are variably positional on the support grid so at to vary the effective diameter of the support grid.

17 Claims, 5 Drawing Sheets

PLATFORM ASSEMBLY FOR A WIND TURBINE TOWER

FIELD OF THE INVENTION

The present subject matter relates generally to wind turbines and, more particularly, to a platform assembly within the tower of a wind turbine.

BACKGROUND OF THE INVENTION

Platforms in wind turbine towers provide operators safe access to areas of a wind turbine that may require servicing, maintenance and inspection. For example, the platforms are typically located adjacent to the tower flange bolts for safe and easy inspection of the flange bolts. Typically, a number of service platforms are located at different heights in the turbine tower and are fixed by welding or with bolts to the tower wall.

A conventional type of platform includes a metal plate, typically a checker plate, which is supported by a number of steel beams fixed to the tower walls. Steel beams are heavy, have to be lifted with a crane when mounting the platform in the tower, and are thus generally difficult to install. Further, a significant number of bosses, clip plates, and the like, are necessary to mount the plate to the beams, which is both time and cost intensive.

The conventional platforms are also tailored to a specific tower diameter, and must be redesigned whenever the tower shell diameter or wall thickness changes. This is due primarily to the maintaining of a required maximum space of about one-inch between the circumference of the plate and the tower wall. Thus, each tower design necessitates a unique platform design, which adds to overall construction costs and time, inventory requirements, and so forth.

In light of the above, it is desirable to have a platform for a wind turbine tower which is relatively easy to produce and assemble within the tower, and is versatile so as to be used at different diameter sections of the same or different wind turbine towers.

BRIEF DESCRIPTION OF THE INVENTION

Aspects and advantages of the invention will be set forth in part in the following description, or may be obvious from the description, or may be learned through practice of the invention.

In accordance with aspects of the invention, a modular platform assembly is provided for a wind turbine tower. The platform assembly includes a core platform sub-assembly, which includes an underlying structural support grid. A plurality of platform extension panels are disposed circumferentially around at least a portion of a perimeter of the core platform sub-assembly. Support extensions are configured on the support grid at a plurality of circumferential positions around the core platform sub-assembly, with the platform extension panels supported by the support extensions. The support extensions are mountable to a wall within a wind turbine tower at a plurality of circumferential positions for supporting the platform assembly relative to the tower. The support extensions are variably positional on the support grid so as to vary the effective diameter of the support grid. In this manner, platform extension panels of varying sizes can be configured with a common core platform sub-assembly at varying diameter positions within the wind turbine tower.

In a particular embodiment, the support grid has terminal ends at the circumferential positions of the support extensions, with the support extensions being slidable along the terminal ends.

In certain embodiments, the core platform sub-assembly includes a plurality of individual, multi-sided plate members, with each of the plate members connected to at least one other plate member along a common side. At least certain ones of the plate members have an outboard side that defines a circumferential section of the platform assembly. In one embodiment, all of the plate members have an outboard side and contribute to the circumference of the plate assembly. The connected common sides of the plate members define the structural support grid that connects to the interior wall of the wind turbine tower via the support extensions.

In a particular embodiment of the platform assembly, the plate members are each formed from a single unitary metal plate, with the metal plates having down-turned flanges along the common sides that are connected together to define the structural support grid. The flanges may, for example, be bolted together along the common sides.

In one embodiment, one of the plate members is common to all of the other plate members and thus shares a common side with each remaining plate member. This common plate member may also have an outboard side that defines a circumferential section of the platform assembly. Alternatively, the common plate member may be an interior plate member that is completely surrounded by the other remaining plate members.

It should be appreciated that any one or combination of the plate members may include any manner of access opening or port defined therein, for example to accommodate a lift or ladder, cable runs, and so forth. The plate members may include up-turned flanges that define a toe rail around the access openings.

The platform assembly may further include a plurality of brackets configured for mounting onto the tower wall at the plurality of circumferential support positions, with the brackets defining a seat for the support extensions.

The platform extension panels may have a radial dimension so as to define a minimal predefined gap, for example about one-inch, with the wind turbine tower wall. With this configuration, it may not be necessary or desired to include a toe rail around the circumference of the platform assembly.

The present invention also encompasses any manner of wind turbine having a plurality of the present platform assemblies configured at different heights within the tower. Each of the platform assemblies includes a core platform sub-assembly having an underlying structural support grid. A plurality of platform extension panels are disposed circumferentially around at least a portion of a perimeter of the core platform sub-assembly. Support extensions are configured on the support grid at a plurality of circumferential positions around the core platform sub-assembly, with the platform extension panels supported by the support extensions. The support extensions are mounted to a wall within the tower at a plurality of circumferential positions for supporting the platform assembly relative to the tower. The support extensions are variably positional on the support grid so as to vary the effective diameter of the support grid.

In a unique embodiment of a wind turbine, the core platform sub-assemblies with the tower have a common size (radial aspect), with the platform extension panels having varying sizes between different core platform sub-assemblies to accommodate for different diameters of the tower at the different heights within the tower.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
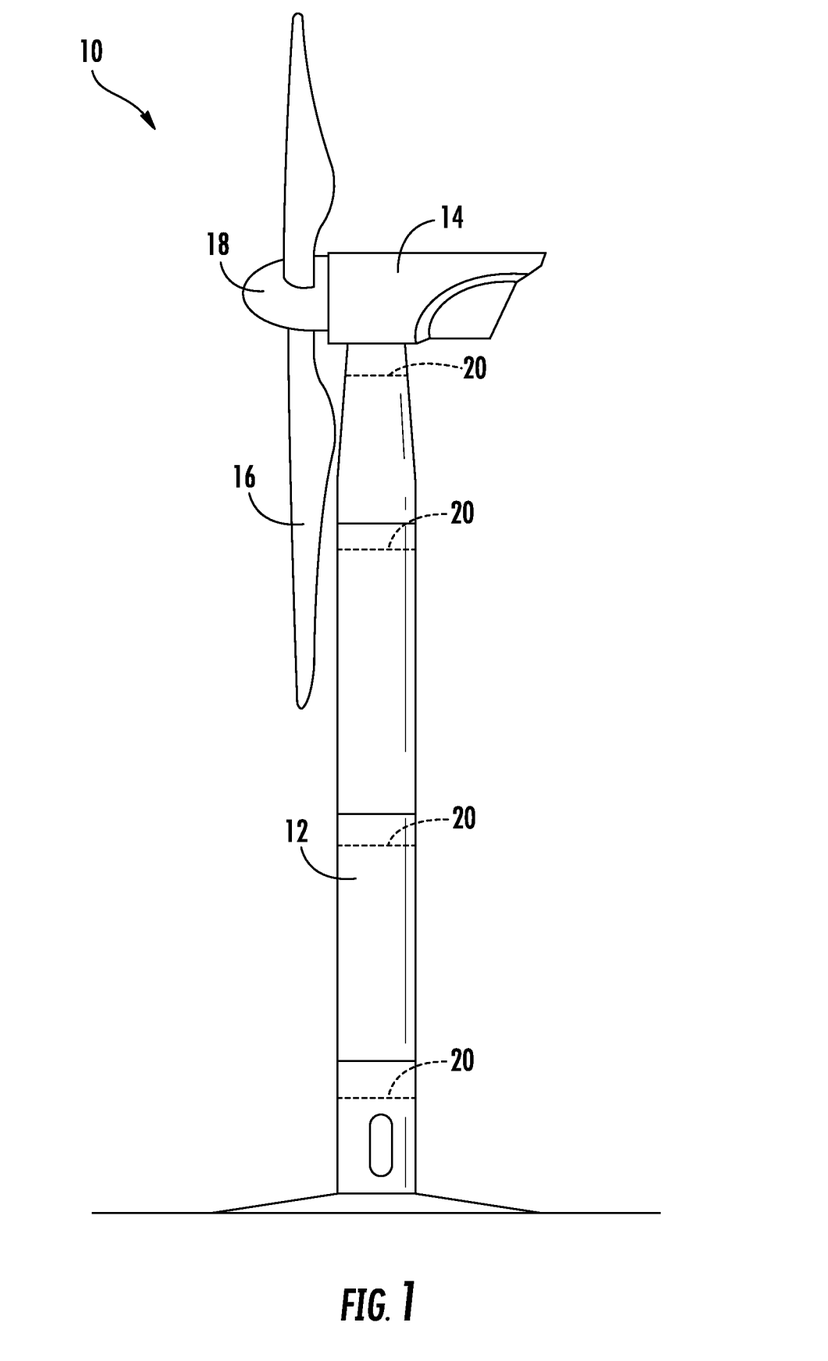
FIG. 1 is a perspective view of one embodiment of a wind turbine with a plurality of interior platform assemblies.

Referring now to the drawings, FIG. 1 illustrates a perspective view of one embodiment of a conventional wind turbine 10 that may utilize one or more platform assemblies 20 in accordance with aspects of the invention. As shown, the wind turbine 10 generally includes a tower 12 erected on a suitable foundation or support surface, a nacelle 14 mounted on the tower 12, and a rotor 18 coupled to the nacelle 16. The rotor 18 includes a rotatable hub and one or more rotor blades 16 coupled to and extending outwardly from the hub. The rotor blades 16 capture the kinetic energy of the wind, which is converted into usable mechanical energy, and subsequently, electrical energy via a drivetrain and generator positioned within the nacelle 14.

The tower 12 is a tubular structure that may be constructed from individual stacked segments that are bolted together at flange locations (which may correspond to the location of the platform assemblies 20), as is well known in the art. These segments may be formed from any number or combination of suitable materials, including metal and concrete. Typically, a plurality of platform assemblies 20 are disposed at different heights within the tower 12, for example at the flange bolt locations. These platform assemblies 20 serve various functions, including a rest stop for personnel that climb the tower 12 to access the nacelle 14, inspection and maintenance platforms, equipment support platforms, and so forth. The number of platform assemblies 20 and their respective heights within the tower 12 depends on the individual configuration of the wind turbine 10. The number of platform assemblies is typically from 2 to 6, more typically from 3 to 5. In a non-limiting example, platforms are provided, for example, at 4.4 m height (4.2 m platform diameter), at 21 m (4.2 m diameter), at 46 m (3.3 m diameter), at 68 m (2.7 m diameter) and at 75 m (2.5 m diameter).

Figure 2:
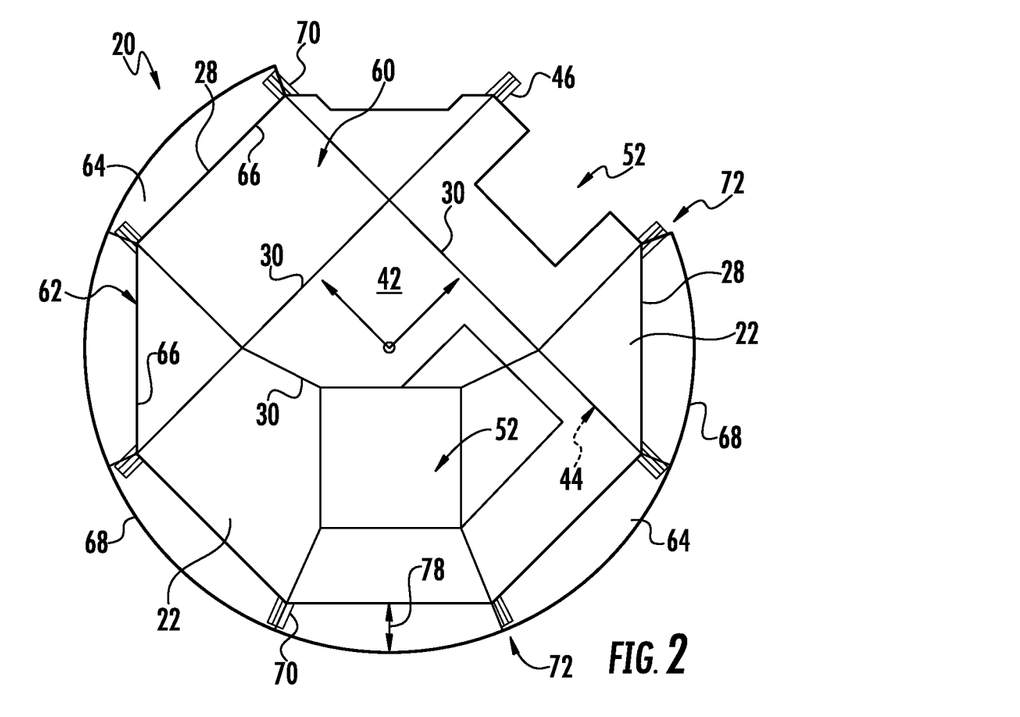
FIG. 2 is a top view of an embodiment of a platform assembly.
Figure 3:
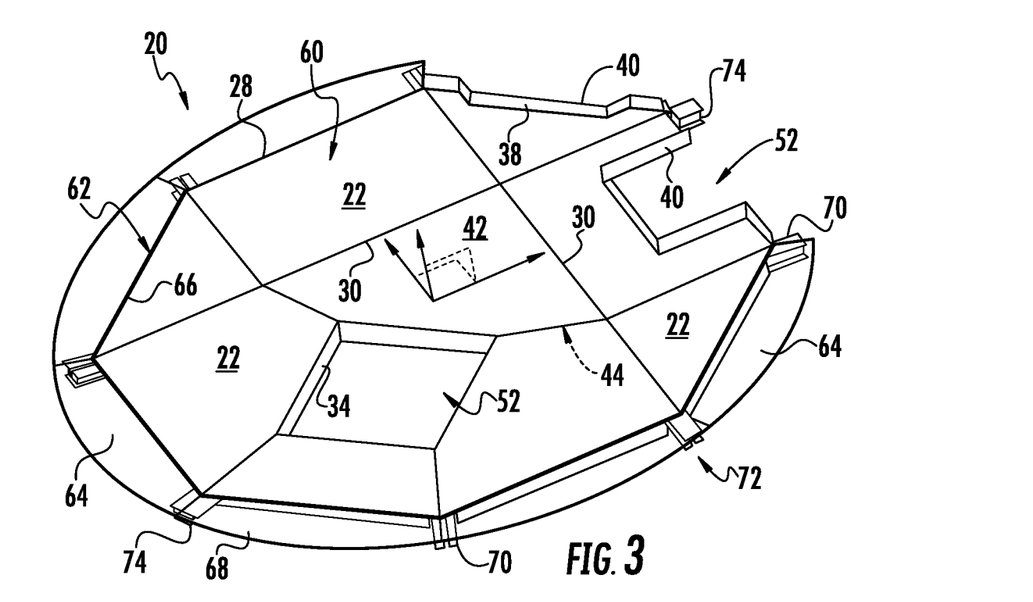
FIG. 3 is a top perspective bottom view of the platform assembly of FIG. 2.
Figure 4:
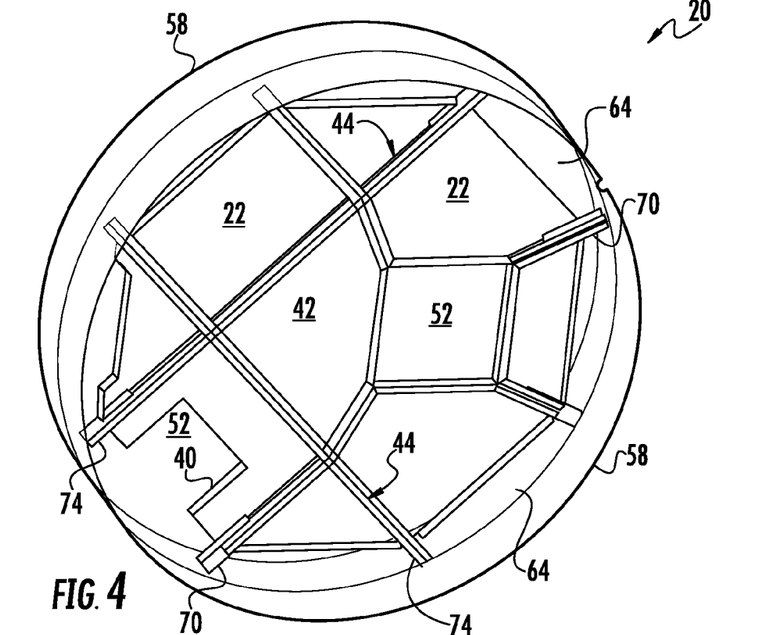
FIG. 4 is a bottom perspective view of an embodiment of a platform assembly.

An embodiment of a platform assembly 20 is depicted in FIGS. 2 through 4. The assembly is a modular construction in that it includes a core platform sub-assembly 60 and a plurality of platform extension panels 64 disposed circumferentially around at least a portion of the perimeter edges 62 of the sub-assembly 60. The core platform sub-assembly is a "center" component of the platform assembly 20 and may have constant or uniform dimensions regardless of the varying inner diameters of a tower 12 in which the assemblies 20 are installed. The platform extension panels 64 are the "finishing" components that may be manufactured in varying sizes and radial dimensions to accommodate the varying inner diameters of the different towers (or different locations within the same tower).

Referring to FIGS. 2 through 4 in general, the core platform sub-assembly 60 includes an underlying structural support grid 44 (described in greater detail below). This support grid is mounted to the wind turbine tower 12 at a plurality of circumferentially disposed support positions 72 for supporting the platform assembly 20 relative to a wall 58 (FIG. 7) of the tower 12. Support extensions 70 are configured with the support grid 44 at all or some of the positions 72 and extend from terminal ends 46 of the support grid 44 at the respective positions 72 to a mounting bracket or fixture 54 (FIG. 7) on the tower wall. The support extensions 70 are variably positionable on the support grid 44 (explained in greater detail below) so as to vary the effective diameter of the support grid 44. For example, the support extensions 70 may be slidable in a radial aspect relative to the core platform sub-assembly 60, as depicted by the arrow 80 in FIG. 7. Other adjustment mechanisms and configurations are also within the scope and spirit of the invention that serve to increase/vary the effective diameter of the underlying support grid 44.

In the illustrated embodiments, support extensions 70 are defined by flange members 74 (FIG. 5) that slide relative to the support grid members 44. The flanges 74 may be joined (e.g., by welding, bolting, etc.) at a forward radial end and have an internal channel 76 in which the terminal end of the down-turned flanges 34 slide. The flanges 76 may slide along the footers 36 defined on the flanges 34. In an alternate embodiment, the flanges 74 may be completely separate members that are moved in unison relative to the support grid 44.

Figure 6:
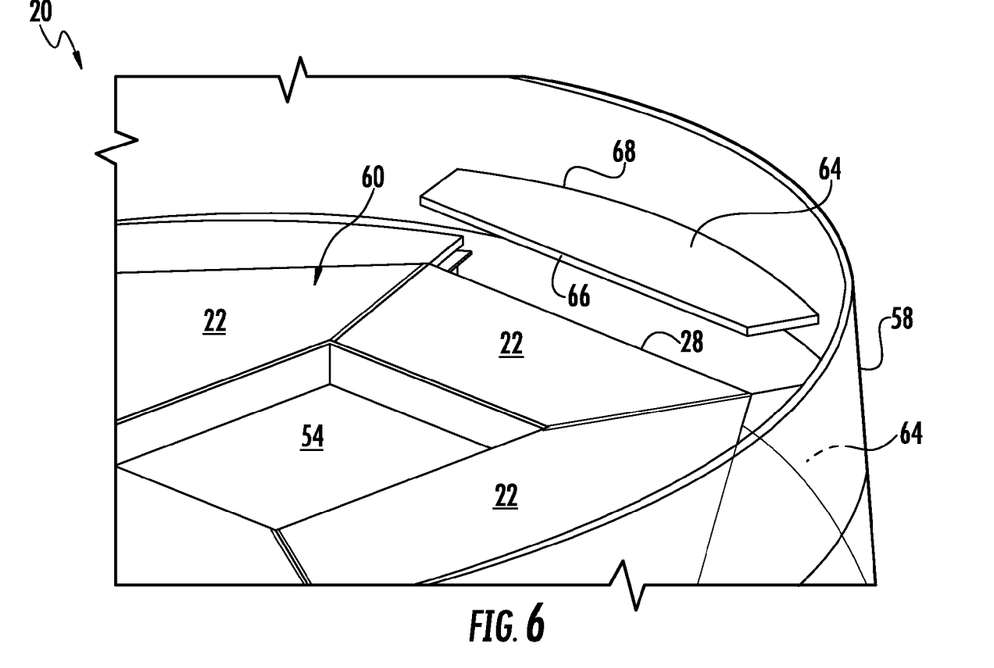
FIG. 6 is an enlarged top perspective view of a platform extension panel fitted to a core platform assembly.

As depicted in the figures in general, the platform extension panels 64 are supported by and span between adjacent support extensions 70, as particularly seen in FIG. 6. The extension panels 64 have an inboard engagement edge 66 that abuts against the perimeter edges of the core platform sub-assembly 60, and a rounded outboard edge 68 that extends to adjacent the tower wall 58 (FIG. 7), with a radial dimension between the edges 66 and 68. The extension panels 64 are sized for the respective diameter of the tower wall 58 so that a required minimal space is defined between the outboard edges 68 and tower wall 58, for example about one-inch.

Figure 8:
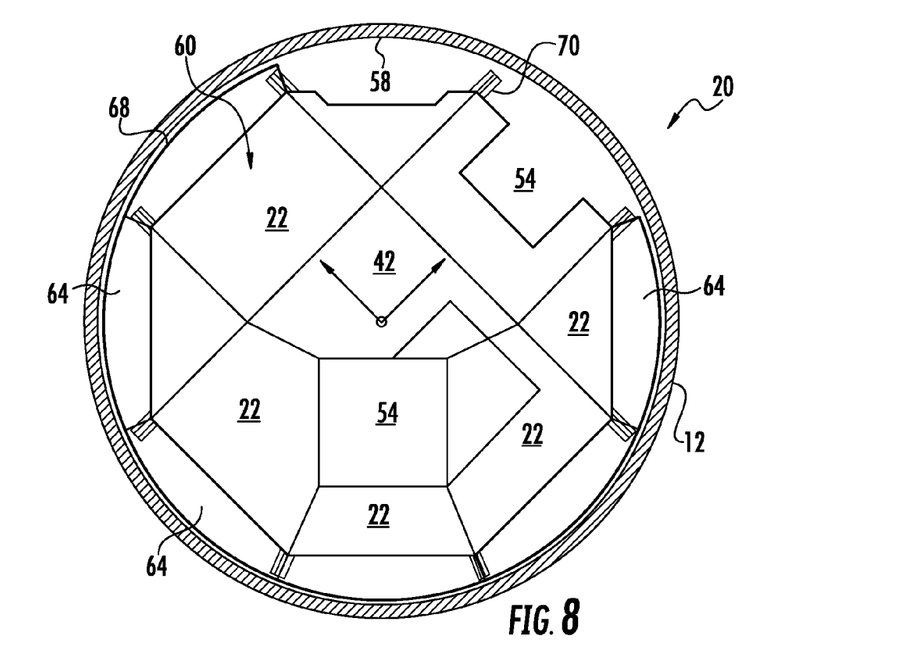
FIG. 8 is a top view of a platform assembly within a tower having a first inner diameter.
Figure 9:
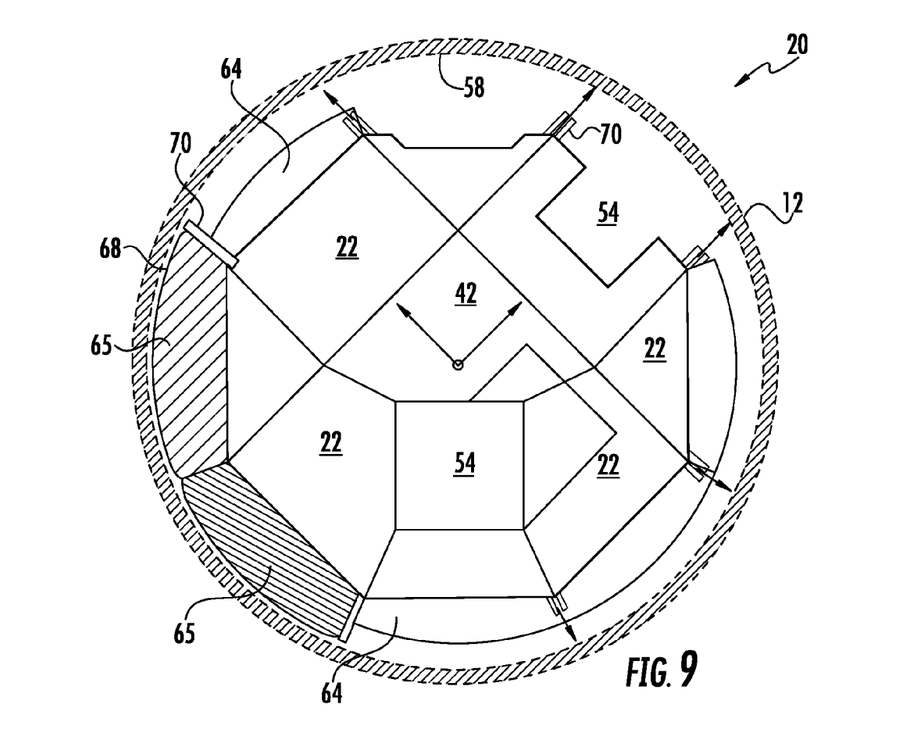
FIG. 9 is a top view of the platform assembly of FIG. 8 within a different tower having an increased inner diameter.

It can be appreciated from the above discussion, and particularly from the views of FIGS. 8 and 9, that a manufacturer need not make individual, unique platform assemblies 20 for every wind tower 12. The manufacturer may maintain an inventory of one or more sizes of core platform sub-assemblies 60, e.g., four separate designs/sizes, and an inventory of differently sized extension panels 64 that can be configured with any of the core platform sub-assemblies 60 to accommodate varying diameter towers 12 or varying diameters within the same tower 12.

For example, FIG. 8 illustrates a platform assembly 20 mounted to a tower wall 58 within a tower 12, with the wall having a given inner diameter. The platform extension panels 60 extend from the core sub-assembly 60 to within a prescribed distance from the tower wall 58. FIG. 9 depicts the same core sub-assembly 60 within a tower 12 having an increased diameter wall 58 as compared to FIG. 8 (or a different diameter location within the same tower 12). The arrows at the support extensions 70 depict the extensions being slid radially outward relative to the core sub-assembly 60 to accommodate for the increased diameter. Likewise, different extension panels 65 (having an increased radial dimension) are substituted for the previous extension panels 64.

The core platform sub-assembly 60 may be variously configured. For example, in the depicted embodiments, the sub-assembly 60 is defined by a plurality of individual, multi-sided plate members 22, with each of the plate members 22 connected to at least one other plate member 22 along a common (shared) side 30. As readily seen in FIGS. 2 and 3, certain of the plate members 22 have a common side 30 with two other plate members, and certain other plate members 22 have a common side 30 with three other plate members. Certain of the plate members 22 have an outboard side 28 that defines a portion of the perimeter edge 62 of the overall core platform sub-assembly 60.

Figure 7:
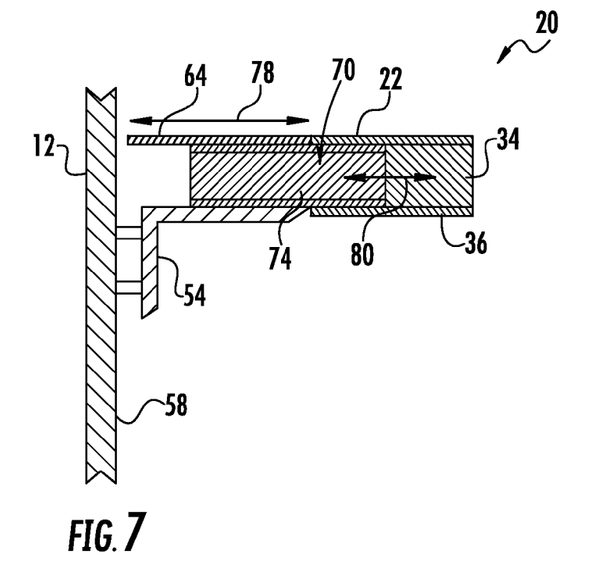
FIG. 7 is a side cut-away view of a bracket configuration between a platform assembly and wind turbine tower.

As particularly seen in FIGS. 2 through 5, in the illustrated embodiments, the connected common sides 30 of the plate members 22 define a structural support grid 44 on the underside of the core platform sub-assembly 60 that may adequately function as the sole load supporting structure. In the illustrated embodiments, the structural support grid 44 defines a web-like girder with terminal ends 46 that radiate to the plurality of support positions 72 at the circumference of the core platform sub-assembly 60. As seen in FIG. 7, the platform assembly 20 is supported on the interior wall 58 of the tower 12 at these support positions 72 by the support extensions 70 mounted to brackets 54 that are welded, screwed, or otherwise attached to the tower wall 58. The brackets 54 may have any suitable configuration, such as the L-flange shape depicted in FIG. 7, and define a seat for the structural support grid 44 via the support extensions 70, which may be bolted or otherwise attached to the bracket 54.

Figure 5:
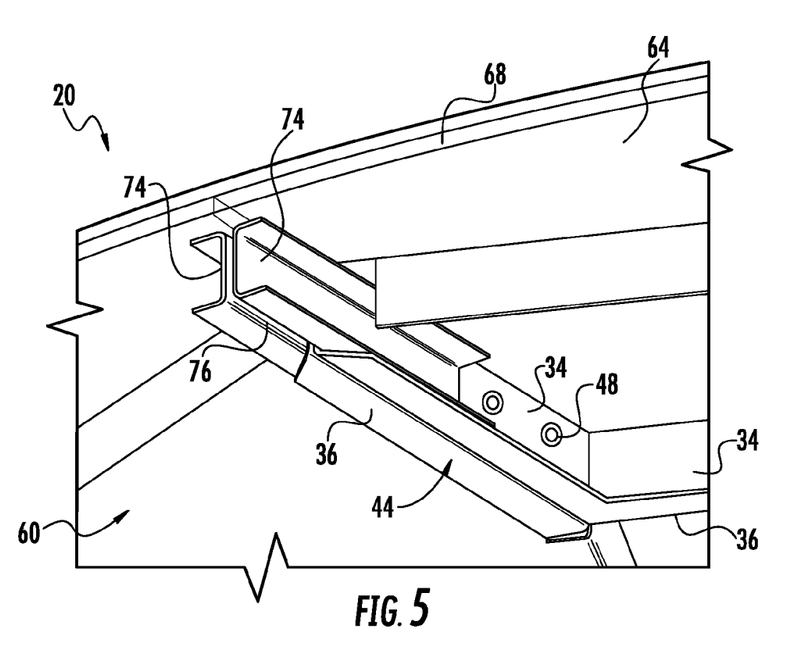
FIG. 5 is an enlarged side perspective view of an embodiment of a support extension and platform extension panel.

The individual plate members 22 may be variously configured. For example, the plate members 22 may be formed from a single unitary metal plate that collectively define a generally uninterrupted upper surface 24 of the platform assembly 20. The metal plates may have down-turned flanges 34 along the common sides 30 that are connected together on the underside of the core sub-assembly 60 and define the structural support grid 44. The vertical dimensions of the flanges 34 (and thus strength of the support grid 44) will be a function of the expected loads on the platform assembly 20. The down-turned flanges 34 may include footers 36 (FIGS. 5 and 7).

The down-turned flanges 34 are desirably bent into their orientation relative to the upper surface of the plate members 22 so as to avoid welding steps. Alternatively, the flanges 34 may be separately attached, for example by welding, bolts, or other suitable means.

The size, shape, and configuration of the plate members may vary widely within the scope and spirit of the invention.

For example, referring to FIGS. 2 through 4, one of the plate members 22 may be a common interior plate member 42 that is surrounded by outboard plate members 22. This common plate member may also define a side of any manner of access opening 52.

Any configuration of access openings 52 may be provided in the plate members 22 for various purposes. For example, an interior access opening 52 may be provided to accommodate a lift, while another is provide in the outboard side 28 of one or more of the plate members 22 for a ladder that extends along the interior was of the tower. Additional access openings 52 may be provided along the outboard sides 28 for cable and bus runs.

Referring to the figures in general, a toe rail 40 may be defined around the various access openings 52. In one embodiment, this toe rail 40 may consist of one or more separate components that are attached to the plate members 22. In the illustrated embodiments, as particularly illustrated in FIG. 3, the toe rail 40 is defined by up-turned flanges 38 formed at the outboard sides 28 of the plate members 22 that define the access opening 52. Angle pieces may be provided at the junction of adjacent up-turned flanges 38.

The plate members 22 may be connected together by various means. In the illustrated embodiments, the down-turned flanges 34 along the common sides 30 are bolted together with bolts 48 (FIG. 5) and define the continuous support grid 44. In an alternate embodiment, the flanges 34 may be welded together.

It should be readily appreciated that the present invention also encompasses any manner of wind turbine 10 (FIG. 1) that utilizes one or more of the platform assemblies 20 in accordance with aspects set forth herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A modular platform assembly for a wind turbine tower, comprising:
    a core platform sub-assembly, said core platform sub-assembly further comprising an underlying structural support grid;
    a plurality of platform extension panels disposed circumferentially around at least a portion of a perimeter of said core platform sub-assembly;
    radially extending support extensions configured on said underlying structural support grid at a plurality of circumferential positions around said core platform sub-assembly, each of said plurality of platform extension panels extending between and supported by two adjacent said support extensions, said support extensions mountable to a wall within the wind turbine tower at the plurality of circumferential positions for supporting said modular platform assembly relative to the wind turbine tower;
    said support extensions being variably positional on said underlying structural support grid so as to vary an effective diameter of said underlying structural support grid such that platform extension panels of varying sizes can be configured with a common said core platform sub-assembly at varying diameter positions within the wind turbine tower; and said support extensions slidable radially outward from terminal ends of said underlying structural support grid at the plurality of circumferential positions without extending above said underlying structural support grid such that said plurality of platform extension panels extend radially outward above said support extensions to adjacent the wall within the wind turbine tower.

2. The modular platform assembly as in claim 1, wherein said core platform sub-assembly comprises a plurality of individual, multi-sided plate members, each of said plurality of individual, multi-sided plate members connected to at least one other of said plurality of individual, multi-sided plate members along a common side, at least certain of said plurality of individual, multi-sided plate members having an outboard side that defines a circumferential section of said core platform sub-assembly; said common sides of said plurality of individual, multi-sided plate members defining said underlying structural support grid.

3. The modular platform assembly as in claim 2, wherein each of said plurality of individual, multi-sided plate members are formed from a single unitary metal plate, said single unitary metal plates comprising down-turned flanges along said common sides, said down-turned flanges connected together to define said underlying structural support grid, said support extensions slidable along said down-turned flanges.

4. The modular platform assembly as in claim 2, wherein each of said plurality of individual, multi-sided plate members comprises a respective outboard side such that every one of said plurality of individual, multi-sided plate members defines a circumferential section of said modular platform assembly.

5. The modular platform assembly as in claim 2, wherein one of said plurality of individual, multi-sided plate members is common to all other of said plurality of individual, multi-sided plate members and shares a common side with each of the remaining said plurality of individual, multi-sided plate members.

6. The modular platform assembly as in claim 5, wherein said common one of said plurality of individual, multi-sided plate members comprises a respective outboard side and defines a circumferential section of said modular platform assembly.

7. The modular platform assembly as in claim 5, wherein said common one of said plurality of individual, multi-sided plate members is an interior plate member completely surrounded by the other remaining said plurality of individual, multi-sided plate members.

8. The modular platform assembly as in claim 2, wherein at least one of said plurality of individual, multi-sided plate members comprises an access opening defined therein and up-turned flanges that define a toe rail around said access opening.

9. The modular platform assembly as in claim 1, wherein said plurality of platform extension panels have a radial dimension so as to define a minimal predefined gap with the wind turbine tower wall.

10. The modular platform assembly as in claim 1, further comprising a plurality of brackets configured for mounting onto the wind turbine tower wall at the plurality of circumferential support positions, said plurality of brackets defining a mounting seat for said support extensions.

11. A wind turbine, comprising:
a tower;
a nacelle supported atop said tower;
a rotor hub and rotor blades configured with said nacelle;
a plurality of platform assemblies disposed at different heights within said tower, each of said plurality of platform assemblies further comprising:
a core platform sub-assembly, said core platform sub-assembly further comprising an underlying structural support grid;
a plurality of platform extension panels disposed circumferentially around at least a portion of a perimeter of said core platform sub-assembly;
radially extending support extensions configured on said underlying structural support grid at a plurality of circumferential positions around said core platform sub-assembly, each of said plurality of platform extension panels extending between and supported by two adjacent said support extensions, said support extensions mounted to a wall within said tower at the plurality of circumferential positions for supporting said plurality of platform assemblies relative to said tower;
said support extensions being variably positional on said underlying structural support grid so at to vary an effective diameter of said underlying structural support grid; and
said support extensions slidable radially outward from terminal ends of said underlying structural support grid at the plurality of circumferential positions without extending above said underlying structural support grid such that said plurality of platform extension panels extend radially outward above said support extensions to adjacent the wall within the wind turbine tower.

12. The wind turbine as in claim 11, wherein said core platform sub-assemblies have a common size, said plurality of platform extension panels having varying sizes between different said core platform sub-assemblies to accommodate for different diameters of said tower at the different heights within said tower.

13. The wind turbine as in claim 11, wherein said core platform sub-assemblies comprise a plurality of individual, multi-sided plate members, each of said plurality of individual, multi-sided plate members connected to at least one other of said plurality of individual, multi-sided plate members along a common side, at least certain of said plurality of individual, multi-sided plate members having an outboard side that defines a circumferential section of said core platform sub-assembly, said common sides of said plurality of individual, multi-sided plate members defining said underlying structural support grid.

14. The wind turbine as in claim 13, wherein each of said plurality of individual, multi-sided plate members are formed from a single unitary metal plate comprising down-turned flanges along said common sides, said down-turned flanges connected together to define said underlying structural support grid, said support extensions slidable along said down-turned flanges.

15. The wind turbine as in claim 13, wherein at least one of said plurality of individual, multi-sided plate members comprises an access opening defined therein and up-turned flanges that define a toe rail around said access opening.

16. The wind turbine as in claim 11, wherein said plurality of platform extension panels have a radial dimension so as to define a minimal predefined gap with said tower.

17. The wind turbine as in claim 11, further comprising a plurality of brackets mounted on said tower at the plurality of circumferential support positions, said plurality of brackets defining a mounting seat for said support extensions.

* * * * *